US011321907B1

(12) United States Patent
Dagani et al.

(10) Patent No.: US 11,321,907 B1
(45) Date of Patent: May 3, 2022

(54) METHOD AND APPARATUS FOR GRAPHICS DRIVER OPTIMIZATION USING DAEMON-BASED RESOURCES

(71) Applicant: Samsung Electronics Co., Ltd., Suwon-si (KR)

(72) Inventors: Gabriel T. Dagani, Austin, TX (US); Raun M. Krisch, Dripping Springs, TX (US); Zachary Neyland, Santa Clara, CA (US); Robert Metzger, Austin, TX (US); David C. Tannenbaum, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/227,270

(22) Filed: Apr. 9, 2021

Related U.S. Application Data (60) Provisional application No. 63/155,727, filed on Mar. 2, 2021.

(51) Int. Cl.
  *G06T 15/00* (2011.01)
  *G06T 17/00* (2006.01)
  *G06F 8/41* (2018.01)

(52) U.S. Cl.
  CPC ............ *G06T 15/005* (2013.01); *G06F 8/443* (2013.01); *G06T 17/00* (2013.01)

(58) Field of Classification Search
  None
  See application file for complete search history.

(56) References Cited

U.S. PATENT DOCUMENTS

| 8,134,566 B1 * | 3/2012 | Brown | G06T 15/04 345/522 |
|---|---|---|---|
| 8,365,153 B2 | 1/2013 | Chen et al. | |
| 9,612,810 B2 | 4/2017 | Kawachiya et al. | |
| 9,727,339 B2 | 8/2017 | Zelsnack | |
| 9,747,084 B2 | 8/2017 | Hall | |

(Continued)

FOREIGN PATENT DOCUMENTS

CN          111736850 A       10/2020

OTHER PUBLICATIONS

Christopher Arthur Lattner, "Macroscopic Data Structure Analysis and Optimization", May 2005, University of Illinois at Urbana-Champaign, Dissertation.*

*Primary Examiner* — Robert Bader
(74) *Attorney, Agent, or Firm* — Renaissance IP Law Group LLP (57) ABSTRACT

A system and a method are disclosed that optimizes a graphics driver. The system may be embodied as a computing device that includes a storage that is internal to the computing device, a graphic processing unit that includes a driver and a controller. The controller may be configured to run a daemon process that optimizes a shader and/or a shader pipeline for an application that is resident on the computing device when the computing device is not running the application and stores at least one optimization for the shader in the storage. The at least one optimization may be based on the application. The daemon process may further receive a request from the driver of the GPU for an optimization for the shader/shader pipeline during a runtime compilation of the shader and provide the at least one optimization to the driver of the GPU from the storage.

20 Claims, 3 Drawing Sheets

(56) References Cited

U.S. PATENT DOCUMENTS

| | | |
|---|---|---|
| 9,996,325 B2 | 6/2018 | Lim et al. |
| 10,296,345 B2 | 5/2019 | Zelsnack |
| 2008/0001956 A1* | 1/2008 | Markovic ............. G06T 15/005 |
| | | 345/522 |
| 2017/0024191 A1* | 1/2017 | Esliger ................... G06F 1/329 |

* cited by examiner

METHOD AND APPARATUS FOR GRAPHICS DRIVER OPTIMIZATION USING DAEMON-BASED RESOURCES

CROSS-REFERENCE TO RELATED APPLICATION

This application claims the priority benefit under 35 U.S.C. § 119(e) of U.S. Provisional Application No. 63/155,727, filed on Mar. 2, 2021, the disclosure of which is incorporated herein by reference in its entirety.

TECHNICAL FIELD

The subject matter disclosed herein relates to graphic processing units (GPUs). More particularly, the subject matter disclosed here relates to a system and method for optimizing graphics drivers.

BACKGROUND

A graphics processing unit (GPU) uses shader programs (shaders), textures, and geometric models to render application-specific graphics for a display. Typically, shader programs for GPUs on portable devices, such as smartphones and tablets, are compiled at runtime by a central processing unit (CPU) of the portable device to render the application-specific graphics. The shaders are compiled at runtime because the application using the GPU may not have all the parameters relating to the GPU hardware that is native on a portable device prior to run-time.

Runtime shader compilation may have inherent tradeoffs because optimizations occur during multiple compilation passes by a compiler when there is only a limited window of time to load the application before a user becomes impatient. Additional constrains may include a limited battery power that is available for all system operations, not just for shader compilation, and a maximum operating temperature that may be exceeded by multiple compilation passes. As the number of optimizations increase, the compilation time becomes correspondingly longer. For example, if a game application has thousands of shaders to compile, it may take an exceedingly long time for the game application to be ready for play, thereby increasing a likelihood that a user may become impatient by the delay. Consequently, shortcuts are usually taken during runtime compilation to improve compile time, but at the cost of shader-program efficiency. The tradeoffs may typically be made at a coarse level (e.g., agnostic to specific applications) in order to be most efficient for a majority of application and device hardware combinations. The tradeoffs are generally generic-type optimizations for an end-user environment about which only assumptions may be made. Memory blobs and similar storage techniques may be used to provide persistence to improve load time, but nevertheless an original compile operation may not have unlimited time to optimize shaders/as sets.

SUMMARY

An example embodiment provides a computing device that may include a storage that is internal to the computing device, a graphics processing unit, and a controller. The graphics processing unit may include a driver. The controller may be coupled to the storage, and the controller may be configured to run a daemon process that optimizes one or more of one of a shader and a shader pipeline for an application that is resident on the computing device when the computing device is not running the application. The daemon process may store at least one optimization for the one or more one of the shader and the shader pipeline in the storage in which the at least one optimization may be based on the application. The daemon process may provide the at least one optimization for the one or more one of the shader and the shader pipeline to the driver of the graphics processing unit from the storage in response to a request from the driver of the graphics processing unit for an optimization for the shader during a runtime compilation of the shader. In one embodiment, the daemon process may be configured to optimize one of the shader and the shader pipeline when the computing device is not running the application and the computing device is being charged. In another embodiment, the at least one optimization for the one or more of the shader and the shader pipeline may include a conversion of the one or more of the shader and the shader pipeline to a native format of the graphics processing unit of the computing device. In still another embodiment, the daemon process may be configured to optimize a texture used by the application when the computing device is not running the application, store at least one optimization for the texture in the storage, and provide the at least one optimization for the texture to the driver of the graphics processing unit from the storage in response to a request from driver of the graphics processing unit for an optimization for the texture during a runtime compilation of the shader. In one embodiment, the daemon process may be configured to return a descriptor to the driver of the graphics processing unit that indicates at least one characteristic for the at least one optimization that is different from a non-optimized version of the texture. In yet another embodiment, the daemon process may be configured optimize a geometric model used by the application when the computing device is not running the application, store at least one optimization for the geometric model in the storage, and provide the at least one optimization for the geometric model to the driver of the graphics processing unit from the storage in response to a request from the driver of the graphics processing unit for an optimization for the geometric model during a runtime compilation of the shader. In one embodiment, the daemon process may be configured to send the at least one optimization for the one or more of the one of the shader and the shader pipeline to a database that is external to the computing device. The daemon process may be configured to provide the at least one optimization for the one or more of the one of the shader and the shader pipeline to the driver of the graphics processing unit from one of the storage that is internal to the computing device and the database that is external to the computing device. The computing device may be a smartphone, a tablet, or a laptop computer.

An example embodiment provides a computing device that may include a storage that is internal to the computing device, a graphics processing unit and a controller. The graphics processor unit may include a driver. The controller may be coupled to the storage, and may be configured to run a daemon process that: optimizes one of a shader and a texture for an application that is resident on the computing device when the computing device is not running the application and stores at least one optimization for the shader and at least one optimization for the texture in the storage, and provides one of the at least one optimization for the shader and the at least one optimization for the texture to the driver of the graphics processing unit from the storage in response to a request from the driver of the graphics processing unit for an optimization for one of the shader and the texture during a runtime compilation of the shader. In one embodiment, the daemon process may be configured to optimize one of the shader and the texture when the computing device is not running the application and the computing device is being charged. In another embodiment, the daemon process may be configured to optimize a geometric model that may include three-dimensional vertices used by the application when the computing device is not running the application, store at least one optimization for the geometric model in the storage, and provide the at least one optimization for the geometric model to the driver of the graphics processing unit from the storage in response to a request from the driver of the graphics processing unit for an optimization for the geometric model during a runtime compilation of the shader. In still another embodiment, the daemon process may be configured to send one of the at least one optimization for the shader and the at least one optimization for the texture to a database that is external to the computing device. In one embodiment, the daemon process may be configured to provide one of the at least one optimization for the shader and the at least one optimization for the texture to the driver of the graphics processing unit from one of the storage that is internal to the computing device and the database that is external to the computing device. The computing device may be a smartphone, a tablet, or a laptop computer.

An example embodiment provides a method for optimizing shader compilation on a computing device in which the method may include: optimizing, by a daemon process, one of a shader and a texture for an application that is resident on a computing device when the computing device is not running the application; storing, by the daemon process, at least one optimization for the shader and at least one optimization for the texture in a storage that is internal to the computing device; receiving, by the daemon process, a request from a driver of a graphic processing unit of the computing device for an optimization for one of the shader and the texture during a runtime compilation of the shader; and providing, by the daemon process, one of the at least one optimization for the shader and the at least one optimization for the texture to the driver of the graphics processing unit from the storage. In one embodiment, optimizing one of the shader and the texture when the computing device is not running the application may further include optimizing one of the shader and the texture when the computing device is not running the application and the computing device is being charged. In another embodiment, the method may further include optimizing, by the daemon process, a geometric model used by the application when the computing device is not running the application; storing, by the daemon process, at least one optimization for the geometric model in the storage; receiving, by the daemon process, a request from the driver of the graphics processing unit for an optimization for the geometric model during a runtime compilation of the shader; and providing, by the daemon process, the at least one optimization for the geometric model to the driver of the graphics processing unit from the storage. In one embodiment, the method may also include sending, by the daemon process, one of the at least one optimization for the shader and the at least one optimization for the texture to a database that is external to the computing device; and providing, by the daemon process, one of the at least one optimization for the shader and the at least one optimization for the texture to the driver of the graphics processing unit from one of the storage that is internal to the computing device and the database that is external to the computing device. The computing device may be a smartphone, a tablet, or a laptop computer.

BRIEF DESCRIPTION OF THE DRAWING

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

In one embodiment, the subject matter disclosed herein provides a system and a process that scans a portable device for specific applications (target applications), such as games, that are resident on the device and that compile shaders at runtime. The portable device may be, for example, a closed product, like a smartphone, a tablet, a laptop, or a fixed appliance, that includes a specific GPU having a specific clock rate, and a display screen having a specific size, resolution, and a fixed and/or a variable refresh rate. The process may be a daemon process or a daemon-like application that runs in the background on the device and that is not under direct control of an interactive user. When the device is idle, the daemon process may recompile stored shaders and/or complete shader pipelines with more exhaustive optimizations enabled; likewise, data assets (for example, textures and/or geometric models having three-dimensional (3D) vertices that may represent a character or a 3D object) for the applications may also be converted into more optimized formats that take advantage of native hardware. Thus, these shaders and data assets may be tailored to the device. That is, when the device is not running a target application and/or when the device is being charged (and may be generally idle), shaders and data assets may be compiled or optimized "offline" by the daemon process using an "unbounded" compile time to generate improvements and optimizations that may be stored locally for later use. When a target application is run, a GPU driver on the device may communicate with the daemon process to obtain any improvements and/or optimizations (shader and/or data assets) that are stored locally on the device and that may be used instead of shaders and/or data assets that are requested to be compiled/retrieved at runtime on a per-application basis.

The daemon process may use heuristics to identify problematic interactions between a GPU driver and a specific application and generate "offline" improvements and optimizations to improve performance, startup time, and application-specific bug fixes of the application. For example, the offline improvements and optimizations on a per-application basis may include, but are not limited to, shader-compiler configurations and/or settings that improve shader compile efficiency and/or shader compile time; reducing shader compiler/driver overhead; reducing application load (startup) time; generating precompiled shader pipelines; turning on or off GPU driver settings/driver capabilities, changing graphic driver capability limits; improving or optimizing textures to provide a high-level of texture quality in the native format of the device; generating of additional quality and size of textures; generating different texture compressions; generating application-specific enhancements; and/or improving peak application performance.

In another embodiment, the subject matter disclosed herein provides a system and a process that scans a device for specific applications that compile shaders at runtime. The disclosed system and process may compile improved and/or optimized shaders and/or data assets for the applications when the device is, for example, idle using an "infinite" compile time to generate improvements and optimizations that may be stored locally for later use. Additionally, the disclosed system and method may download improved and/or optimized shaders and/or data assets from a storage that is external to the device, such as a cloud service that hosts application profiles and optimization assets. The data assets that may be downloaded from the cloud may include, but are not limited to, pre-compiled shaders, shader-compiler feature configurations, modified texture assets, GPU driver extensions, and/or capability feature configurations. Shaders and/or data assets that are optimized on a device by the disclosed system and process may be uploaded to the storage that is external to the device (e.g., a cloud service) to be validated, to be accessed by other similar devices and/or to provide customer preferences for subjective improvements. Shaders for the device may be optimized by the cloud service and made available to the device by being communicated to the disclosed process.

In still another embodiment, the system and process disclosed herein may include an opt-in feature that sends performance metrics to the cloud for further optimization efforts, such as updating game profiles for future optimizations. Example performance metrics may include, but are not limited to, performance and initialization time for different applications and benchmarks, performance based on system setup (e.g., quality level of graphics), GPU utilization rate, frame rate measurements, and bandwidth usage (e.g., the amount of data the GPU reads and writes that travels beyond the GPU itself and/or beyond a lowest-level cache (LLC)). An automated and curated (cloud based) testing infrastructure may accumulate device-optimized shaders and/or data assets that are based on real-life, field-use cases providing "wisdom-of-crowds" optimizations. Another aspect of the subject matter disclosed herein may include performing "infinite-time" optimizations in the cloud that may be used to replace runtime compilation on a device. Performance data received from multiple devices may be used to determine that particular optimizations for an application should be turned off to save compile/runtime if it is found that the particular optimizations do not improve the application. Additionally, feedback from devices may be used to beta-type test optimizations in the field.

In one embodiment, a database that is external to a portable device may contain one or more configuration profiles for popular applications and games for a particular GPU and GPU driver. Each configuration profile may be statically optimized by application and game providers for the particular GPU and GPU driver on a per-application/game basis to provide an enhanced set of user-configuration settings that may be responsively communicated to the daemon process and/or may allow users to lookup optimal solutions and selectively apply a solution.

Different types of statistics may also be collected through opt-in feedback that may be used to improve a Quality of Service (QoS) aspect of current and future products, such as which shaders are most worth optimizing and which optimizations might improve future products. It also may be worthwhile obtaining information relating to how often particular pixels shaders are run, which might lead to adding/modifying/deprecating various ISA-level instructions. If it is possible to learn about current, immediate game play, it may be possible to select a particular variant of a shader that is more optimal for particular conditions and/or a given scenario. For example, it may be useful to know the number of texture accesses that occur based on a setting being configured for power savings as opposed to high-resolution configuration or a configuration for complex graphical effects. If, for example, a graphics-resolution configuration is set to be low, a simpler Big O complexity variant of an algorithm may save power as opposed to a fast, but energy-expensive version.

A GPU driver may be supplemented by a local database on a device that is managed by a daemon process or daemon-like application that runs in the background and provides services to the GPU driver. The daemon process may compile shaders/data assets on demand using a run-time profile, and subsequently may replace or store variants of shaders in the local database under separate profiles that include more extensive optimizations. During time periods when the device may not be actively running demanding applications, (and/or perhaps plugged into power), the daemon process may asynchronously compile all stored shaders with "unbounded" compile time to optimize the shaders based on profile attributes and format and hardware constraints that are native to the device. Profile attributes may include, but are not limited to, memory footprint, performance efficiency, and/or reduced precision to improve frame-rates. A user may select a profile for an application for which the selected profile is then accessed and used by the GPU driver when the application is run. Additionally, the daemon process may improve textures and geometric models by converting the textures to native formats or applying native compression schemes, removing unused levels of detail that may reduce bandwidth requirements along with the corresponding descriptors that inform the application of the changes; the new assets may be used by the GPU hardware and GPU driver of the device.

One example embodiment provides a method of optimizing shader compilation on a portable device that includes a graphics processing unit (GPU) in which the method may include scanning one or more applications on the target device to determine application-specific data relating to shaders, textures and/or geometric models. The application-specific data may be communicated from a GPU driver to a daemon process that is located on the target device and that is separate from the GPU driver. The daemon process may use the application-specific data to generate improved and/or optimized shaders, textures and/or geometric models. The improved and/or optimized shaders, textures and/or geometric models may be received by the GPU driver and used when an application corresponding to the improved and/or optimized shaders, textures and/or geometric models is run on the device. Feedback information may be communicated to the daemon process for the daemon process to asynchronously further improve and/or optimize the shaders, textures and/or geometric models.

The application-specific data and/or the feedback information may be communicated to a process that is external to the device, such as a cloud service and/or resources located on a local area network (LAN) to which the device is connected. The cloud service and/or the resources located on the LAN may provide alternative compilation versions of the shaders, textures and/or geometric models that may be communicated to the device. A user of the device may select a particular compilation version to be used by the GPU driver when a corresponding application is run on the device. The optimizations available from the cloud service and/or the resources located on the LAN may be beta-type tested by a group of devices in the field to further refine improved and/or optimal shaders, textures and/or geometric models.

Figure 1:
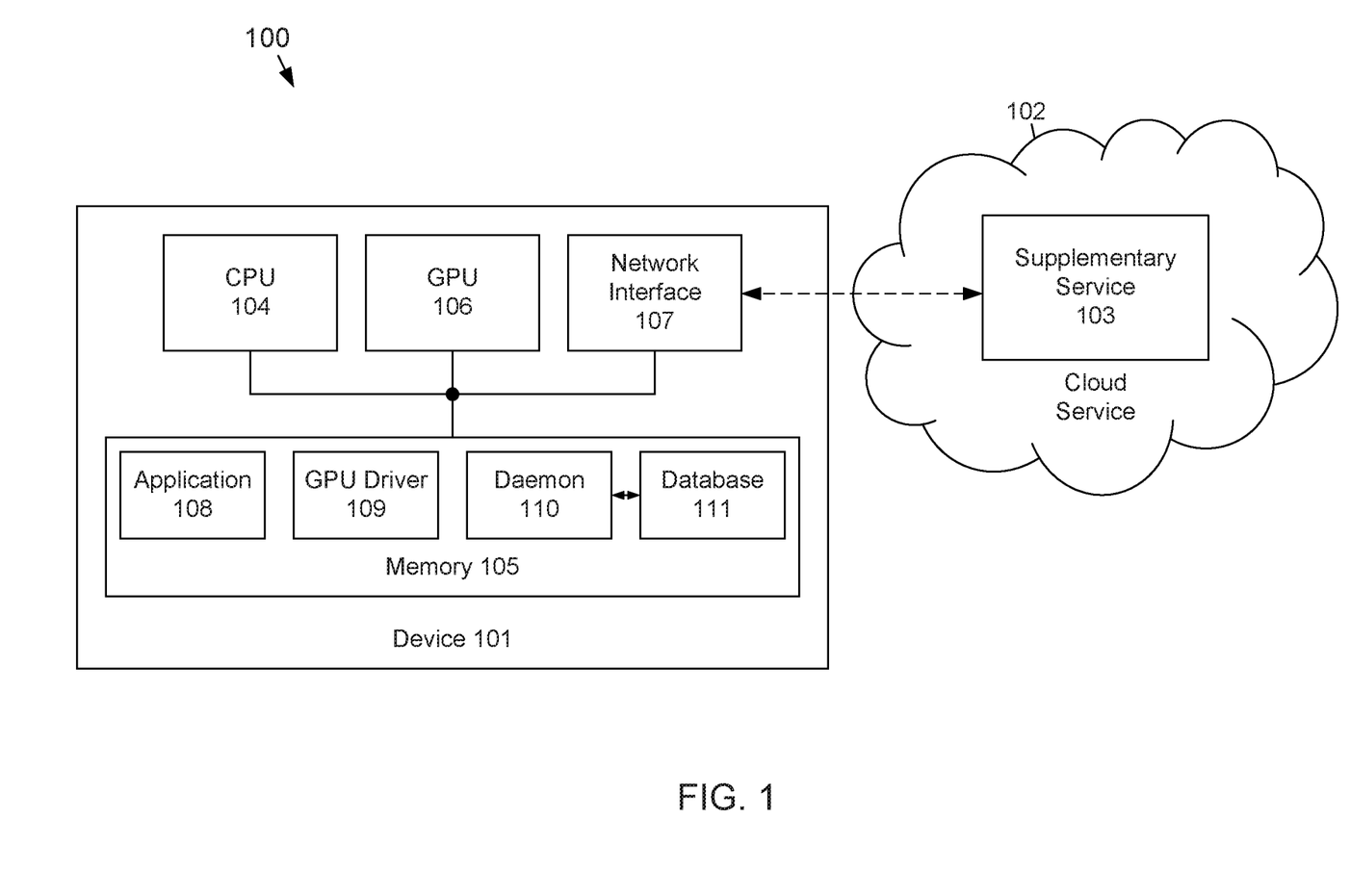
FIG. 1 depicts a system for graphics-driver optimization according to the subject matter disclosed herein.

FIG. 1 depicts a system 100 for graphics-driver optimization according to the subject matter disclosed herein. The system 100 includes a device 101 that may be communicatively coupled to a cloud service 102 that may provide optional supplementary services 103. The device 101 may be a portable computing device, such as, but not limited to, a smartphone, a laptop or a tablet. It should also be understood that the device 101 may not necessarily be a portable device because in one embodiment the device 101 may be desktop computer or a relatively non-mobile computing device. Alternatively or additionally, although a cloud service 102 is depicted in FIG. 1 as providing the supplementary services 103, in an alternative embodiment, the supplementary services 103 may be located on resources on a LAN that may be communicatively coupled to the device 101.

The device 101 may include one or more CPUs 104, a memory 105, one or more GPUs 106, and a network interface device 107 coupled together as shown. A CPU 104 may run an application 108 that is stored in the memory 105. The application 108 may include shaders, textures and/or geometric models that are compiled at runtime. Each GPU 106 may have a corresponding GPU driver 109 stored in the memory 105. A compiler service (daemon) 110 stored in the memory 105 may run in the background of the device 101 and interface with a graphics driver 109 and a local database 111 in the memory 105. The compiler service 110 may be a daemon process or a daemon-like application. The daemon process 110 may run as a background process on the device 101 and is not under direct control of an interactive user. In one embodiment, the compiler service 110 may be implemented as a module. When the application 108 is initiated and the GPU driver 109 begins to compile shaders, textures and/or geometric models of the application 108, the GPU driver 109 communicates with the daemon process 110 to obtain shaders, textures and/or geometric models that may be improved and/or optimized in comparison to the shaders, textures and/or geometric models that the GPU driver 109 may compile at runtime.

The device 101 may also include components and/or modules, and functionality that are not indicated in FIG. 1 for clarity. For example, the device 101 may include components and/or modules, such as, but not limited to, a display, a memory, a memory controller, a persistent storage device, a user interface, and a network interface (wired and/or wireless). The various components and/or modules of the device 101 may be implemented as any combination of software, firmware and/or hardware configured to provide the functionality described herein in connection with a component and/or a module and to provide the functionality that may be associated with the device 101.

The (optional) cloud service 102 may include one or more servers (not shown), which may be running a supplementary service 103 that may be accessed by the daemon process 110 through a network interface 107 of the device 101 and a corresponding communication network (not shown) to the cloud service 102. Alternatively or additionally, the supplementary service may be located on a resource of a LAN that may be accessed by the daemon process 108. The supplementary service 103 may accumulate improved and optimized shaders, textures and/or geometric models that are generated by daemon processes running on other devices (not shown). The daemon process 110 may access the improved and/or optimized shaders, textures and/or geometric models accumulated on the supplementary service 103.

Figure 2:
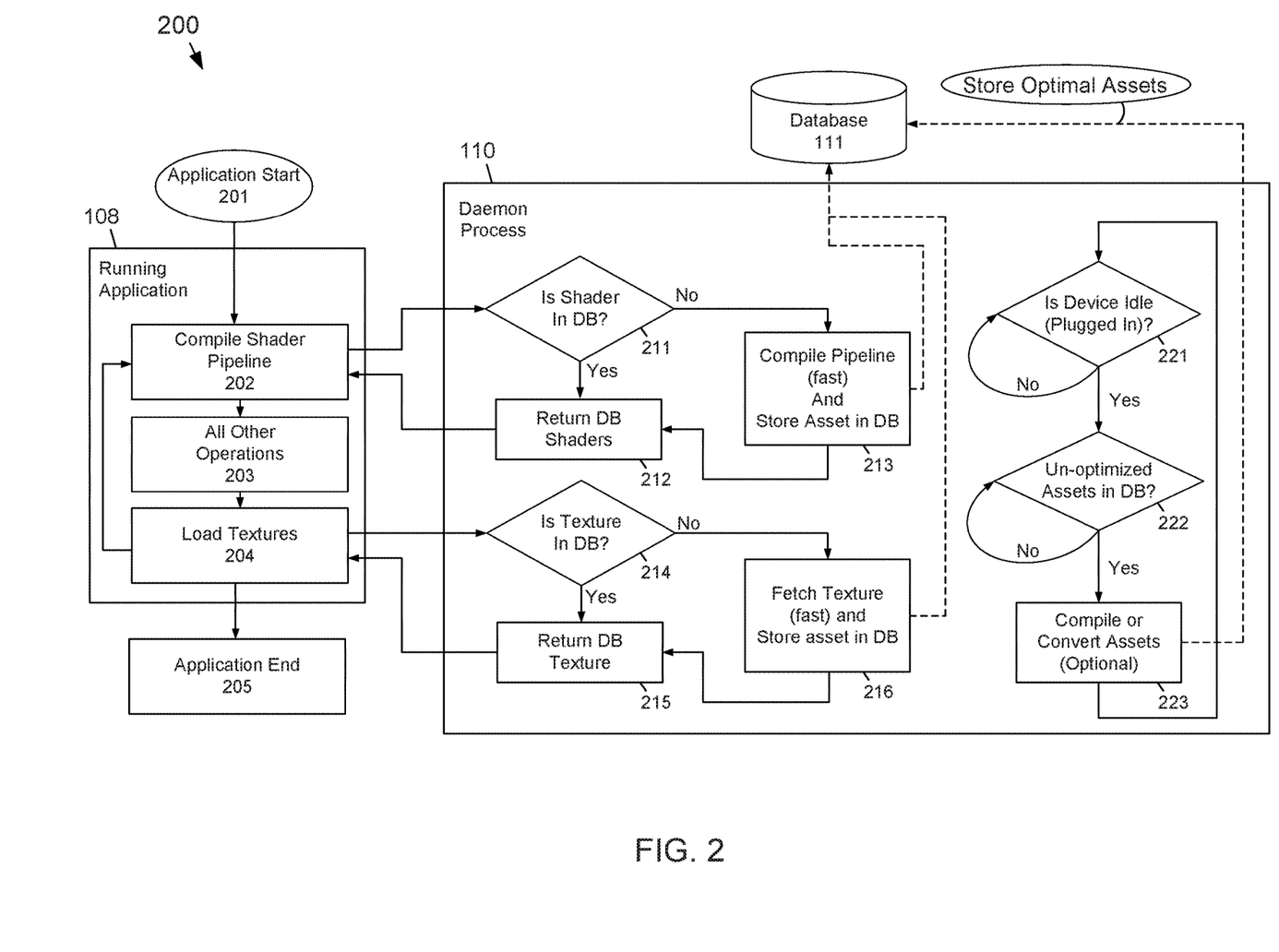
FIG. 2 depicts a flowchart of an example embodiment of a method for graphics driver optimization using cloud-based resources according to the subject matter disclosed herein.

FIG. 2 depicts a flowchart of an example embodiment of a method 200 for graphics driver optimization using cloud-based resources according to the subject matter disclosed herein. The method 200 involves an application 108 and a daemon process 110 that runs as a background operation on a device, such as device 101 in FIG. 1. The application 108 may be any application that provides a graphical display output for display on the display of the device 101. Alternatively, the application 108 may be a compute-style application that generates a computational result, but does not produce a graphical output.

Referring to both FIGS. 1 and 2, the application 108 is initiated by a user of the device at 201. At 202, the application 108 causes the GPU driver 109 to compile a shader pipeline. At 203, the application 108 initiates all other operations associated with the application. At 204, textures are loaded and may be within the graphics pipeline. At this point, the application 108 is running. Sometime later, the application 108 ends at 205. Operations 201-205 are operations that normally occur in the device 101 when the application is run. When only operations 201-205 are run (and the daemon process 110 is unavailable), the shaders that are compiled at runtime at 202 and the textures that loaded at 204 may not be optimized because the GPU driver 109 may not have all the parameters relating to the GPU hardware that is native on the device 101 prior to run-time.

According to the subject matter disclosed herein, the daemon process 110 may run as a background process on the device 101. The daemon process 110 may provide graphics-driver optimization for the device 101. When the shader pipeline is being compiled at 202, (and if the daemon process 110 is available on the device 101), the GPU driver 109 queries the daemon process 110 for any improved and/or optimized shaders that are available. At 211, the daemon process 110 determines whether there are any improvements and/or optimizations for the shader pipeline stored in the database 111. If so, the daemon process 110 proceeds to 212 where the improvements and/or optimizations stored in the database 111 for the shader pipeline are returned to the GPU driver 109 and the application 108 at 202. If, at 211, there are no improvements and/or optimizations for the shader pipeline stored in the database 111, the daemon process 110 compiles a shader pipeline at 213. In one embodiment, an initial compilation of a shader pipeline by the daemon process 110 may be a default-level compilation. In another embodiment, an initial compilation of a shader pipeline by the daemon process 110 may be improved over an initial compilation performed by the GPU driver 109. At 213, the shader pipeline generated by the daemon process 110 may be stored in the database 111 for future use, and flow continues to 212 where the initial shader pipeline is returned to the GPU driver 109 and the application 108 and at 202.

When the GPU driver 109 loads textures at 204, the GPU driver queries the daemon process 110 for any improved and/or optimized data assets (textures and/or geometric models) that are available. At 214, the daemon process 110 determines whether there are any improvements and/or optimizations relating to data assets stored in the database 111. If so, the daemon process 110 proceeds to 215 where the improvements and/or optimizations relating to data assets stored in the database 111 are returned to the GPU driver 109 and the application 108 at 204. In addition to returning the optimized texture, a descriptor may also be returned that provides new details about the texture asset in a way so the graphics driver may be informed if the texture must be loaded in a different way do to asset format changes (e.g. size, format style, compression type, level of detail information). For example, an optimized texture may have a smaller size or memory footprint and metadata may be used communicate that a different compression technique may be used to read the texture along with the new size and/or dimensions of the optimized texture. Similarly, an optimized geometric model may have fewer vertices and metadata may be used to communicate a new vertex count for the optimized geometric model. If, at 214, there are no improvements and/or optimizations relating to data assets stored in the database 111, flow continues to 216 where the daemon process 110 initially optimizes data assets and stores the initially optimized data assets in the database 111 for future use. Flow continues to 215 where the initially optimized data assets are returned to the GPU driver 109 and the application 108 at 204.

When the device 101 is not running the application 108 (or another application) and/or when the device is being charged (and may be generally idle), shaders and data assets may be compiled "offline" by the daemon process 110 using an "infinite" compile time to generate improvements and optimizations that may be stored locally for later use. At 221, the daemon process 110 determines whether the device 101 is idle and being charged. In one embodiment when both conditions are met, the daemon process 110 determines at 222 whether there are any un-optimized shaders and/or data assets for applications that are resident on the device. If so, flow continues to 223 where the daemon process 110 (optionally) compiles and/or converts shaders and/or data assets to be improved and/or optimized for applications that are resident on the device 101. Improved and/or optimized shaders and/or data assets are stored in the database 111. Flow returns to 221.

In one embodiment, the daemon process 110 may communicate with a supplementary service 103 that is external to the device 101, such as a cloud service 102 and/or a resource located on a local area network (LAN) to which the device 101 is connected. The cloud service and/or the resources located on the LAN may provide alternative compilation/optimization versions of the shaders, textures and/or geometric models that may be communicated to the device 101. Alternatively, the external database may contain one or more configuration profiles for popular applications and games for a particular GPU and GPU driver. Each configuration profile may be statically optimized by application and game providers for the particular GPU and GPU driver on a per-application/game basis to provide an enhanced set of user-configuration settings that may be responsively communicated to the daemon process and/or may allow users to lookup optimal solutions and selectively apply a solution. A user of the device may select a particular compilation version to be used by the GPU driver when a corresponding application is run on the device. The optimizations available from the cloud service and/or the resources located on the LAN may be beta-type tested by a group of devices in the field to further determine improved and/or optimal shaders, textures and/or geometric models.

Figure 3:
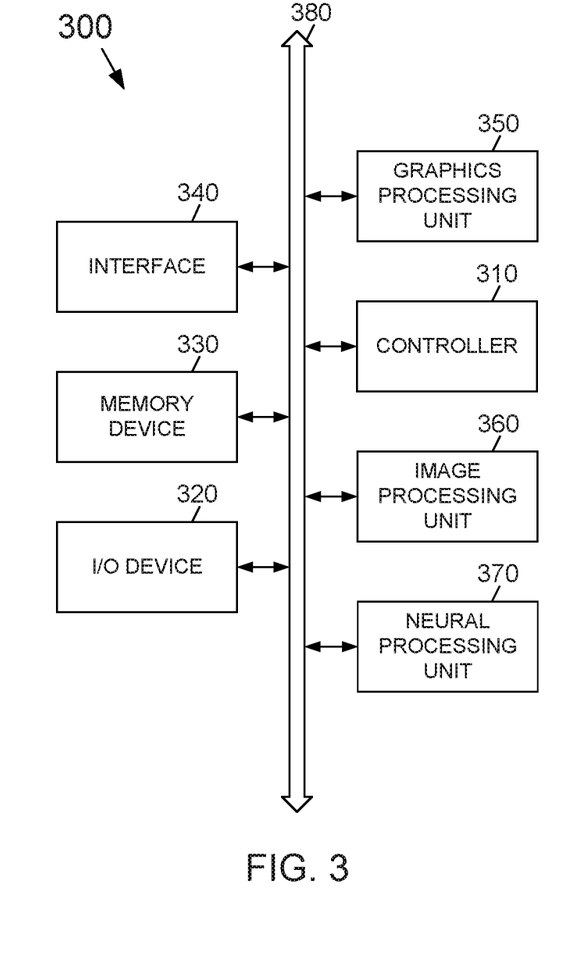
FIG. 3 depicts an electronic device that provides graphics-driver optimization according to the subject matter disclosed herein.

FIG. 3 depicts an electronic device 300 that provides graphics-driver optimization according to the subject matter disclosed herein. The electronic device 300 may include a controller (or CPU) 310, an input/output device 320 such as, but not limited to, a keypad, a keyboard, a display, a touch-screen display, a camera, and/or an image sensor, a memory 330, an interface 340, a GPU 350, an imaging-processing unit 360, and a neural processing unit 370 that are coupled to each other through a bus 380. The controller 310 may include, for example, at least one microprocessor, at least one digital signal processor, at least one microcontroller, or the like. The memory 330 may be configured to store a command code to be used by the controller 310 or a user data. The electronic device 300 may operate to run a daemon process, like the daemon process 110 in FIG. 1, to improve and/or optimize shaders and/or data assets used by an application running on the electronic device according to the subject matter disclosed herein. The daemon process may use the neural processing unit 370 to improve and/or optimize shaders, textures and/or geometric models as disclosed herein.

Electronic device 300 and the various system components of electronic device 300 may include the image processing unit 360. The interface 340 may be configured to include a wireless interface that is configured to transmit data to or receive data from a wireless communication network using a RF signal. The wireless interface 340 may include, for example, an antenna. The electronic system 300 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A computing device, comprising:
a storage internal to the computing device;
a graphics processing unit (GPU) that includes a driver; and
a controller coupled to the storage, the controller configured to run a daemon process that:
optimizes one or more of one of a shader and a shader pipeline for an application that is resident on the computing device when the computing device is not running the application and stores at least one optimization for the one or more one of the shader and the shader pipeline in the storage, the at least one optimization being based on the application, and
provides the at least one optimization for the one or more one of the shader and the shader pipeline to the driver of the GPU from the storage in response to a request from the driver of the GPU for an optimization for the shader during a runtime compilation of the shader.

2. The computing device of claim 1, wherein the daemon process is configured to optimize one of the shader and the shader pipeline when the computing device is not running the application and the computing device is being charged.

3. The computing device of claim 1, wherein the at least one optimization for the one or more of the shader and the shader pipeline comprises a conversion of the one or more of the shader and the shader pipeline to a native format of the GPU of the computing device.

4. The computing device of claim 1, wherein the daemon process is configured to optimize a texture used by the application when the computing device is not running the application, store at least one optimization for the texture in the storage, and provide the at least one optimization for the texture to the driver of the GPU from the storage in response to a request from driver of the GPU for an optimization for the texture during a runtime compilation of the shader.

5. The computing device of claim 4, wherein the daemon process is configured to return a descriptor to the driver of the GPU that indicates at least one characteristic for the at least one optimization that is different from a non-optimized version of the texture.

6. The computing device of claim 1, wherein the daemon process is configured optimize a geometric model used by the application when the computing device is not running the application, store at least one optimization for the geometric model in the storage, and provide the at least one optimization for the geometric model to the driver of the GPU from the storage in response to a request from the driver of the GPU for an optimization for the geometric model during a runtime compilation of the shader.

7. The computing device of claim 1, wherein the daemon process is configured to send the at least one optimization for the one or more of the one of the shader and the shader pipeline to a database that is external to the computing device.

8. The computing device of claim 7, wherein the daemon process is configured to provide the at least one optimization for the one or more of the one of the shader and the shader pipeline to the driver of the GPU from one of the storage that is internal to the computing device and the database that is external to the computing device.

9. The computing device of claim 1, wherein the computing device comprises one of a smartphone, a tablet, and a laptop computer.

10. A computing device, comprising:
a storage internal to the computing device;
a graphics processing unit (GPU) that includes a driver; and
a controller coupled to the storage, the controller configured to run a daemon process that:
optimizes one of a shader and a texture for an application that is resident on the computing device when the computing device is not running the application and stores at least one optimization for the shader and at least one optimization for the texture in the storage, and
provides one of the at least one optimization for the shader and the at least one optimization for the texture to the driver of the GPU from the storage in response to a request from the driver of the GPU for an optimization for one of the shader and the texture during a runtime compilation of the shader.

11. The computing device of claim 10, wherein the daemon process is configured to optimize one of the shader and the texture when the computing device is not running the application and the computing device is being charged.

12. The computing device of claim 10, wherein the daemon process is configured to optimize a geometric model comprising three-dimensional vertices used by the application when the computing device is not running the application, store at least one optimization for the geometric model in the storage, and provide the at least one optimization for the geometric model to the driver of the GPU from the storage in response to a request from the driver of the GPU for an optimization for the geometric model during a runtime compilation of the shader.

13. The computing device of claim 10, wherein the daemon process is configured to send one of the at least one optimization for the shader and the at least one optimization for the texture to a database that is external to the computing device.

14. The computing device of claim 13, wherein the daemon process is configured to provide one of the at least one optimization for the shader and the at least one optimization for the texture to the driver of the GPU from one of the storage that is internal to the computing device and the database that is external to the computing device.

15. The computing device of claim 10, wherein the computing device comprises one of a smartphone, a tablet, and a laptop computer.

16. A method for optimizing shader compilation on a computing device, the method comprising:

optimizing, by a daemon process, one of a shader and a texture for an application that is resident on a computing device when the computing device is not running the application;

storing, by the daemon process, at least one optimization for the shader and at least one optimization for the texture in a storage that is internal to the computing device;

receiving, by the daemon process, a request from a driver of a graphic processing unit (GPU) of the computing device for an optimization for one of the shader and the texture during a runtime compilation of the shader; and providing, by the daemon process, one of the at least one optimization for the shader and the at least one optimization for the texture to the driver of the GPU from the storage.

17. The method of claim 16, wherein optimizing one of the shader and the texture when the computing device is not running the application further comprises optimizing one of the shader and the texture when the computing device is not running the application and the computing device is being charged.

18. The method of claim 16, further comprising:

optimizing, by the daemon process, a geometric model used by the application when the computing device is not running the application;

storing, by the daemon process, at least one optimization for the geometric model in the storage;

receiving, by the daemon process, a request from the driver of the GPU for an optimization for the geometric model during a runtime compilation of the shader; and providing, by the daemon process, the at least one optimization for the geometric model to the driver of the GPU from the storage.

19. The method of claim 16, further comprising:

sending, by the daemon process, one of the at least one optimization for the shader and the at least one optimization for the texture to a database that is external to the computing device; and providing, by the daemon process, one of the at least one optimization for the shader and the at least one optimization for the texture to the driver of the GPU from one of the storage that is internal to the computing device and the database that is external to the computing device.

20. The method of claim 16, wherein the computing device comprises one of a smartphone, a tablet, and a laptop computer.

* * * * *